US012574308B2

(12) United States Patent
Ashino et al.

(10) Patent No.: US 12,574,308 B2
(45) Date of Patent: Mar. 10, 2026

(54) INFORMATION PROCESSING DEVICE, INFORMATION PROCESSING METHOD, AND PROGRAM

(71) Applicant: NEC Corporation, Tokyo (JP)

(72) Inventors: Yuki Ashino, Tokyo (JP); Masahiro Karube, Tokyo (JP); Takashi Hitani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 355 days.

(21) Appl. No.: 18/202,089

(22) Filed: May 25, 2023

(65) Prior Publication Data

US 2023/0396526 A1     Dec. 7, 2023

(30) Foreign Application Priority Data

Jun. 3, 2022     (JP) ................................. 2022-090943

(51) Int. Cl.
*H04L 43/0864*          (2022.01)

(52) U.S. Cl.
CPC ............................... *H04L 43/0864* (2013.01)

(58) Field of Classification Search
CPC .................................................. H04L 43/0864
See application file for complete search history.

(56) References Cited

U.S. PATENT DOCUMENTS

| | | | | | |
|---|---|---|---|---|---|
| 2002/0064185 | A1* | 5/2002 | Nakai | ...................... | H04L 43/50 |
| | | | | | 370/519 |
| 2003/0031185 | A1* | 2/2003 | Kikuchi | .............. | H04L 43/0852 |
| | | | | | 370/392 |
| 2010/0106843 | A1* | 4/2010 | Niiya | ...................... | H04L 67/61 |
| | | | | | 709/228 |
| 2010/0121952 | A1* | 5/2010 | Hara | ...................... | H04W 12/06 |
| | | | | | 709/224 |
| 2014/0095615 | A1* | 4/2014 | Ito | ........................... | H04L 65/80 |
| | | | | | 709/204 |
| 2017/0207866 | A1* | 7/2017 | Fujita | ................... | H04B 17/345 |

FOREIGN PATENT DOCUMENTS

WO          2020/209053 A1     10/2020

\* cited by examiner

*Primary Examiner* — Abdullahi E Salad
(74) *Attorney, Agent, or Firm* — Sughrue Mion, PLLC

(57)          ABSTRACT
An information processing device acquires a measured value of a response time for each of combinations of two target devices of at least three target devices that are communicatively connected to each other, with one of the two devices operating as a first communication device and the other one of the two devices operating as a second communication device. The measured value of the response time is a measured value of a time from start of transmission process of a first communication packet to reception of a second communication packet. The first communication packet is a packet sent from the first communication device to the second communication device. The second communication packet is a packet sent from the second communication device to the first communication device in response to reception of the first communication packet by the second communication device.

11 Claims, 8 Drawing Sheets

FIG. 2

| As | Ar | Bs | Br | Cs | Cr | VARIANCE |
|----|----|----|----|----|----|----------|
| 551 | 709 | 171 | 139 | 211 | 139 | 50714.33 |
| 552 | 708 | 172 | 138 | 212 | 138 | 50697.33 |
| 553 | 707 | 173 | 137 | 213 | 137 | 50682.33 |
| 554 | 706 | 174 | 136 | 214 | 136 | 50669.33 |
| 555 | 705 | 175 | 135 | 215 | 135 | 50658.33 |
| 556 | 704 | 176 | 134 | 216 | 134 | 50649.33 |
| 557 | 703 | 177 | 133 | 217 | 133 | 50642.33 |
| 558 | 702 | 178 | 132 | 218 | 132 | 50637.33 |
| 559 | 701 | 179 | 131 | 219 | 131 | 50634.33 |
| 560 | 700 | 180 | 130 | 220 | 130 | 50633.33 |
| 561 | 699 | 181 | 129 | 221 | 129 | 50634.33 |
| 562 | 698 | 182 | 128 | 222 | 128 | 50637.33 |
| 563 | 697 | 183 | 127 | 223 | 127 | 50642.33 |
| 564 | 696 | 184 | 126 | 224 | 126 | 50649.33 |
| 565 | 695 | 185 | 125 | 225 | 125 | 50658.33 |
| 566 | 694 | 186 | 124 | 226 | 124 | 50669.33 |
| 567 | 693 | 187 | 123 | 227 | 123 | 50682.33 |
| 568 | 692 | 188 | 122 | 228 | 122 | 50697.33 |
| 569 | 691 | 189 | 121 | 229 | 121 | 50714.33 |

$As = 560\,\mu s$
$Ar = 700\,\mu s$
$Bs = 180\,\mu s$
$Br = 130\,\mu s$
$Cs = 220\,\mu s$
$Cr = 130\,\mu s$

| COMMUNICATION DEVICE A $As = 430\,\mu sec$ | RTT: $590\,\mu sec$ | MEASUREMENT TARGET X (UNKNOWN) |

FIG. 8

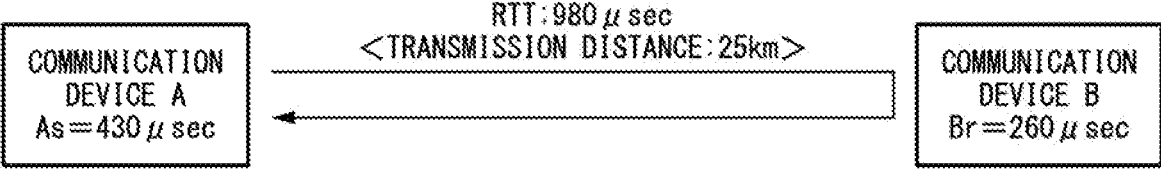

RTT:980 μ sec
<TRANSMISSION DISTANCE:25km>

COMMUNICATION DEVICE A
As=430 μ sec

COMMUNICATION DEVICE B
Br=260 μ sec

FIG. 9

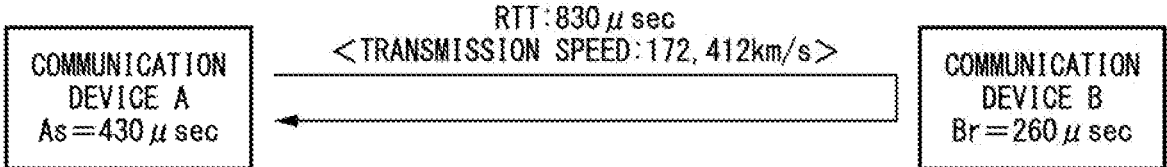

RTT:830 μ sec
<TRANSMISSION SPEED:172, 412km/s>

COMMUNICATION DEVICE A
As=430 μ sec

COMMUNICATION DEVICE B
Br=260 μ sec

FIG. 10

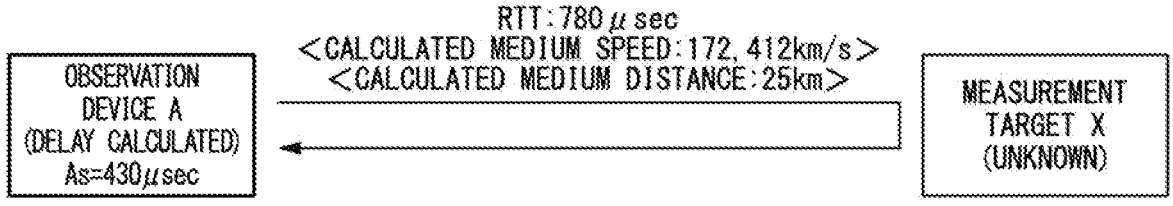

RTT:780 μ sec
<CALCULATED MEDIUM SPEED:172, 412km/s>
<CALCULATED MEDIUM DISTANCE:25km>

OBSERVATION DEVICE A
(DELAY CALCULATED)
As=430 μ sec

MEASUREMENT TARGET X
(UNKNOWN)

FIG. 11

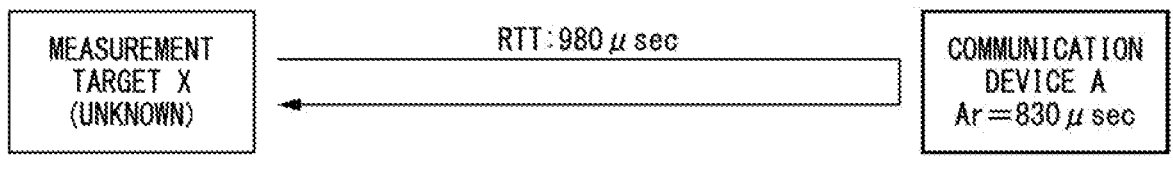

RTT:980 μ sec

MEASUREMENT TARGET X
(UNKNOWN)

COMMUNICATION DEVICE A
Ar=830 μ sec

FIG. 12

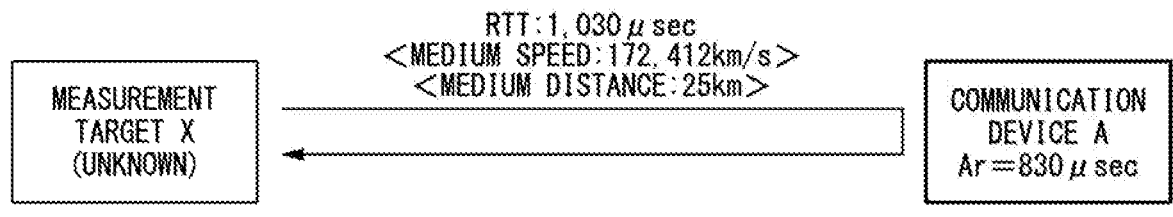

RTT:1, 030 μ sec
<MEDIUM SPEED:172, 412km/s>
<MEDIUM DISTANCE:25km>

MEASUREMENT TARGET X
(UNKNOWN)

COMMUNICATION DEVICE A
Ar=830 μ sec

INFORMATION PROCESSING DEVICE, INFORMATION PROCESSING METHOD, AND PROGRAM

This application is based upon and claims the benefit of priority from Japanese patent application No. 2022-090943, filed on Jun. 3, 2022, the disclosure of which is incorporated herein in its entirety by reference.

TECHNICAL FIELD

The present disclosure relates to an information processing device, an information processing method, and a program.

BACKGROUND ART

PCT International Publication No. WO 2020/209053 discloses a technique for measuring the round-trip time (RTT) when one communication device among a plurality of communication devices connected via a communication network transmits a communication packet to another communication device, and the other communication device transmits to the one communication device a communication packet in response.

It is estimated that the time measured by the RTT measurement as described above is the sum of (a) the time required for the transmission process in the one communication device that sent the communication packet, (b) the time required for the response process in the other communication device, and (c) the time when the communication packet is actually transmitted over the communication path. In such a situation, when trying to measure the distance of the communication path connecting one communication device and another communication device based on RTT, there is a need for a technique to measure how much time is required for (a) the transmission process in the one communication device that sent the communication packet and (b) the response process in the other communication device.

It is therefore an example object of the present disclosure to provide an information processing device, an information processing method, and a program that solve the above-mentioned problem.

SUMMARY

According to the first example aspect of the disclosure, an information processing device includes: a memory configured to store instructions; a processor configured to execute the instructions to: acquire a measured value of a response time for each of combinations of two target devices of at least three target devices that are communicatively connected to each other, with one of the two devices operating as a first communication device and the other one of the two devices operating as a second communication device that is connected to the first communication device via a communication network, the measured value of the response time being a measured value of a time from start of transmission process of a first communication packet to reception of a second communication packet, the first communication packet being a packet sent from the first communication device to the second communication device, the second communication packet being a packet sent from the second communication device to the first communication device in response to reception of the first communication packet by the second communication device; identify, for each of the combinations, a relationship of the response time, an unknown first required time, and the unknown second required time, the first required time being a time from the start of the transmission processing to transmission of the first communication packet, the second required time being a time from the reception of the first communication packet by the second communication device to the transmission of the second communication packet; and calculate an estimated value of the first required time and an estimated value of the second required time by solving simultaneous linear equations of the identified relationship for each of the combinations.

According to the second example aspect of the disclosure, an information processing method includes: acquiring a measured value of a response time for each of combinations of two target devices of at least three target devices that are communicatively connected to each other, with one of the two devices operating as a first communication device and the other one of the two devices operating as a second communication device that is connected to the first communication device via a communication network, the measured value of the response time being a measured value of a time from start of transmission process of a first communication packet to reception of a second communication packet, the first communication packet being a packet sent from the first communication device to the second communication device, the second communication packet being a packet sent from the second communication device to the first communication device in response to reception of the first communication packet by the second communication device; identifying, for each of the combinations, a relationship of the response time, an unknown first required time, and the unknown second required time, the first required time being a time from the start of the transmission processing to transmission of the first communication packet, the second required time being a time from the reception of the first communication packet by the second communication device to the transmission of the second communication packet; and calculating an estimated value of the first required time and an estimated value of the second required time by solving simultaneous linear equations of the identified relationship for each of the combinations.

According to the third example aspect of the disclosure, a non-transitory computer-readable recording mediums that stores program for causes a computer to execute: acquiring a measured value of a response time for each of combinations of two target devices of at least three target devices that are communicatively connected to each other, with one of the two devices operating as a first communication device and the other one of the two devices operating as a second communication device that is connected to the first communication device via a communication network, the measured value of the response time being a measured value of a time from start of transmission process of a first communication packet to reception of a second communication packet, the first communication packet being a packet sent from the first communication device to the second communication device, the second communication packet being a packet sent from the second communication device to the first communication device in response to reception of the first communication packet by the second communication device; identifying, for each of the combinations, a relationship of the response time, an unknown first required time, and the unknown second required time, the first required time being a time from the start of the transmission processing to transmission of the first communication packet, the second required time being a time from the reception of the first communication packet by the second communication device to the transmission of the second communication packet; and calculating an estimated value of the first required time and an estimated value of the second required time by solving simultaneous linear equations of the identified relationship for each of the combinations.

According to the present disclosure, it is possible to calculate the time required for transmission processing in one communication device that sent a communication packet and the time required for response processing in another communication device in the round trip of a communication packet between communication devices.

BRIEF DESCRIPTION OF THE DRAWINGS

FIG. 2 is a diagram that illustrates the processing delay in a communication device.

FIG. 8 is a second diagram showing a utilization example according to the present example embodiment.

FIG. 9 is a third diagram showing a utilization example according to the present example embodiment.

FIG. 10 is a fourth diagram showing a utilization example according to the present example embodiment.

FIG. 11 is a fifth diagram showing a utilization example according to the present example embodiment.

FIG. 12 is a sixth diagram showing a utilization example according to the present example embodiment.

EXAMPLE EMBODIMENT

The following is a description of a communication network according to one example embodiment of the present disclosure with reference to the drawings.

Figure 1:
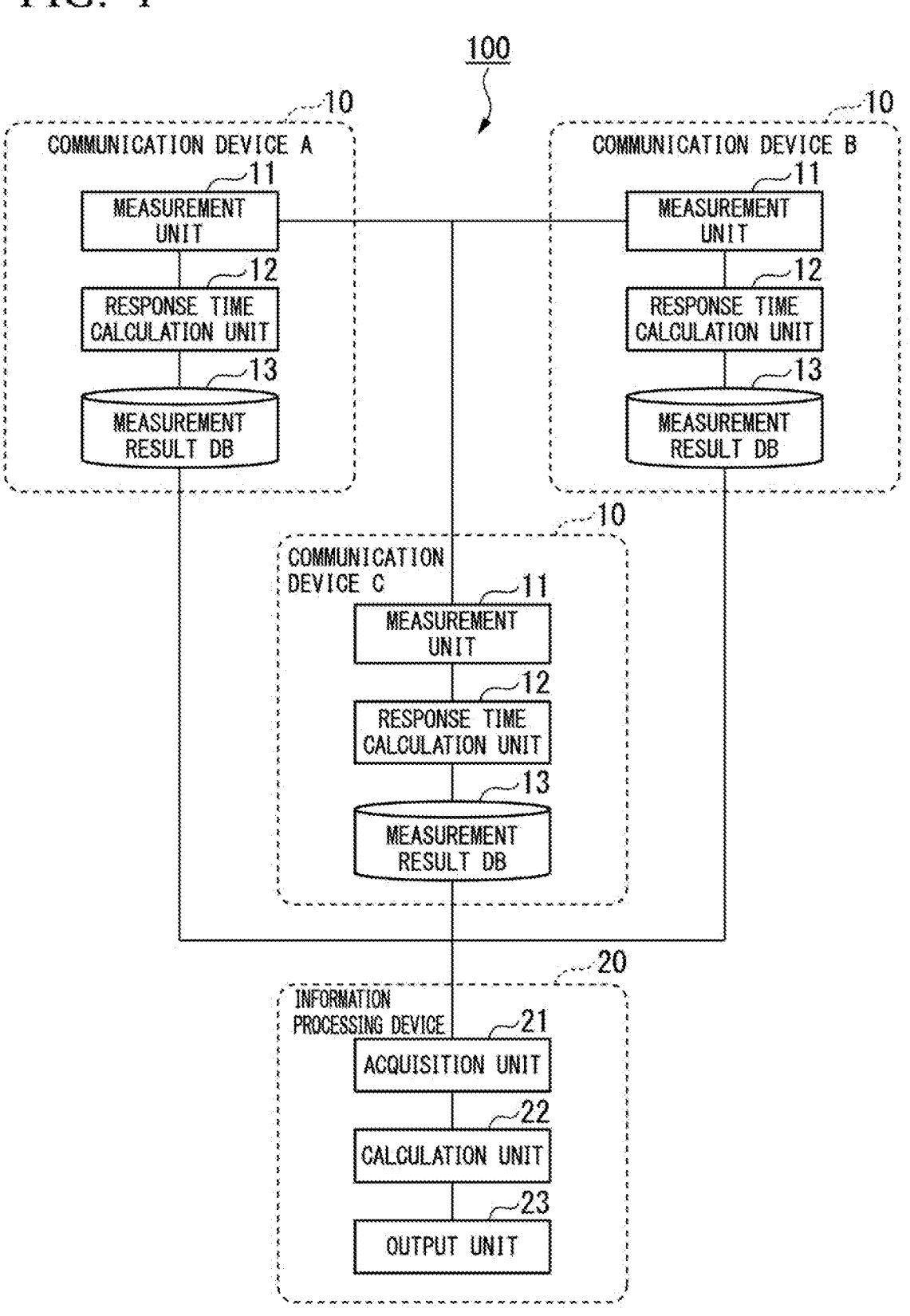
FIG. 1 is a diagram that shows a communication network according to the present example embodiment.

FIG. 1 is a diagram that shows a communication network 100 including an information processing device and a plurality of communication devices according to this example embodiment. In the communication network 100 shown in FIG. 1, three communication devices 10 (communication device A, communication device B, and communication device C) and an information processing device 20 connected via a communication network. More specifically, the communication device A is communicatively connected with the communication device B, the communication device C, and the information processing device 20. The communication device B is communicatively connected with the communication device A, the communication device C, and the information processing device 20. The communication device C is communicatively connected with the communication device A, the communication device B, and the information processing device 20. The communication device A, the communication device B, and the communication device C are collectively referred to as the communication device 10.

Note that in the present example embodiment, the communication path between the communication device A and the communication device B, the communication path between the communication device A and the communication device C, and the communication path between the communication device B and the communication device C are all assumed to be short enough that the transmission time of communication packets on each communication path can be ignored. For example, if it is impossible to detect time intervals of less than one millionth of a second in the communication device A, and if communication packets are transmitted through the communication path at the speed of light (such as through an optical cable), then if the length of the optical cable for each communication path is about 300 m, the transmission time of the communication packets on that short distance path can be ignored because it cannot be physically measured.

Each of the communication device A, communication device B, and communication device C is equipped with the functions of a measurement unit 11, a response time calculation unit 12, and a measurement result database (DB) 13. The measurement unit 11 transmits communication packets to other communication devices 10 to calculate the response time (RTT), receives communication packets in response, and identifies the time of transmission and the time of reception of those communication packets. The response time calculation unit 12 calculates the response time. The measurement result DB 13 stores the calculated response times for communication paths connecting to each of the other communication devices.

The information processing device 20 has the functions of an acquisition unit 21, a calculation unit 22, and an output unit 23. The acquisition unit 21 acquires the response times calculated by each communication device 10 for the communication paths connecting to each of the other communication devices. The calculation unit 22 calculates the time required for transmission processing in one communication device that sent the communication packet and the time required for response processing in the other communication device in the round trip of communication packets between the communication devices. The output unit 23 outputs the calculation result of the calculation unit 22.

More specifically, if two communication devices of the communication devices A, B, and C are designated the first communication device and the second communication device, the first communication device sends a first communication packet to the second communication device connected via a communication network, and the second communication device sends a second communication packet in response to the first communication device based on the reception of the first communication packet at the second communication device.

Subsequently, the information processing device 20 obtains the actual measured values of the response time from the start of the transmission process of the first communication packet in the first communication device to the reception time of the second communication packet, for each of at least three or more communication devices 10 that are connected to each other for communication and operate as the first communication device and the second communication device.

The information processing device 20 identifies the relationships between multiple variables, including the response time, an unknown first required time from the start of transmission processing to transmission of the first communication packet transmitted by the first communication device to the second communication device when the response time is obtained, and an unknown second required time from the reception of the first communication packet by the second communication device until the transmission of the second communication packet in response to the first communication device when the response time is obtained, for each of the at least three communication devices 10 that are connected to each other for communication and operate as the first communication device and the second communication device.

By solving the simultaneous linear equations of those identified relationships, the information processing device 20 calculates the estimated value of the first required time for the first communication device and the estimated value of the second required time for the second communication device.

Figure 2:
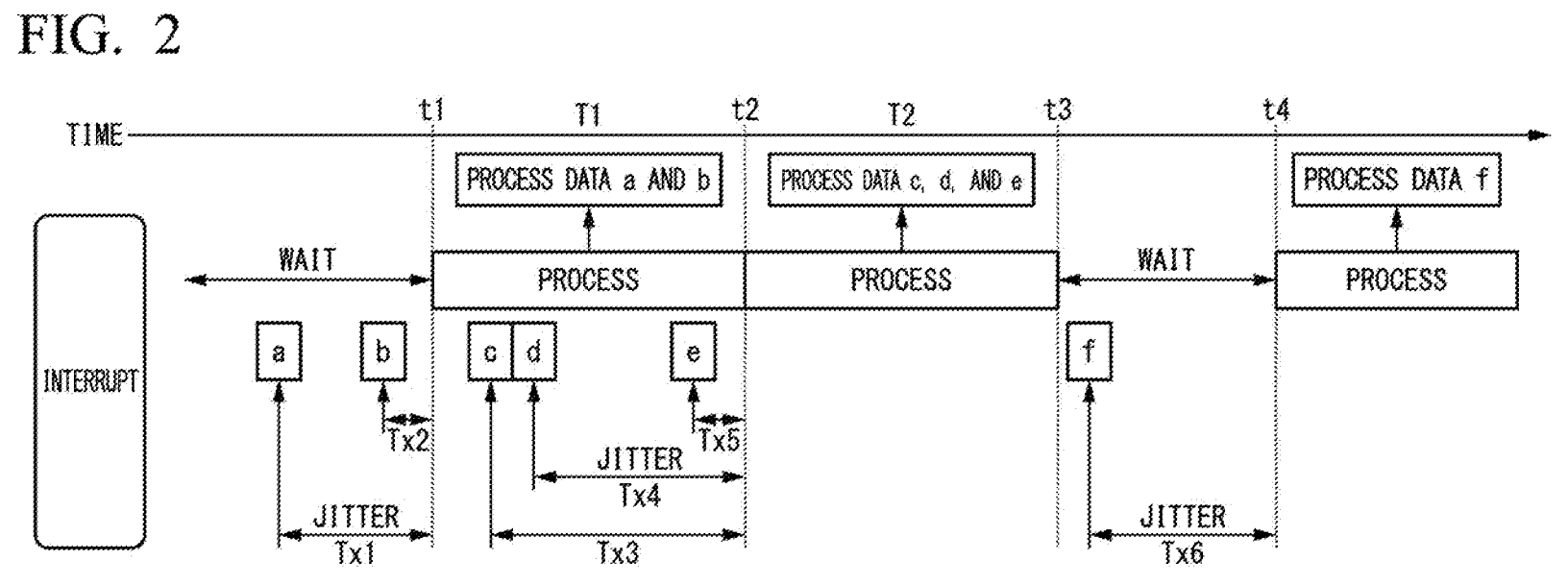

FIG. 2 is a diagram that illustrates a processing delay in a communication device.

In the communication device 10 at the receiving end of the communication packet, a response communication packet is sent to the communication device 10 on the transmission side on the basis of the receipt of the communication packet sent by the communication device 10 on the transmission side. This is called the response process. In this response process, the timing of sending response communication packets varies with time due to interrupt processing in the communication device 10 and other factors.

For example, as shown in FIG. 2, an interrupt process occurs in the communication device 10. As an example, let the communication device 10 on the transmission side be communication device A and the communication device 10 on the reception side be communication device B. The communication device B receives communication packets a, b, c, d, e, and f from the communication device A in this order. Assume that the communication packets a, b, c, d, e, and f are pings. The communication device B, upon receiving a ping communication packet, has the ability to immediately send a ping communication packet in response to the communication device A. At this time, the communication device B performs processing related to communication packets collectively in a predetermined time unit. Then, the communication device B waits for the response processing of communication packets a and b until the processing start time t1, and then performs the response processing during time T1 from that processing start time t1 to the next processing start time t2. In other words, in the communication device B, jitter Tx1 is generated until the processing start time t1 for response processing for communication packet a, and jitter Tx2 is generated until the processing start time t1 for response processing for communication packet b. The communication device B performs the response (ping response) to the communication device A for communication packet a and communication packet b at time T1 in the order in which they were received, respectively.

The communication device B, upon receiving ping communication packets c, d, and e during time T1, waits for response processing of those ping communication packets c, d, and e until the next processing start time t2. The communication device B waits for the response processing of communication packets c, d, and e until the start time t2, and performs the response processing during the time T2 from the processing start time t2 until the next processing start time t3. In other words, in the communication device B, jitter Tx3 is generated until the processing start time t2 for response processing for communication packet c, jitter Tx4 is generated until the processing start time t2 for response processing for communication packet d, and jitter Tx5 is generated until the processing start time t2 for response processing for communication packet e. The communication device B performs the response (ping response) to the communication device A for communication packets c, d, and e at time T2 in the order in which they were received, respectively.

The communication device B, upon receiving a ping communication packet f at a time after time T2, waits to process the response to that ping communication packet f until the next processing start time t4. The communication device B waits for the response processing of communication packet f until the processing start time t4, and then performs the response processing of communication packet f during the time T3 from that processing start time t4 to the next processing start time. In other words, jitter Tx6 is generated in communication device B until the processing start time t4 of the response process for communication packet f. The communication device B performs the response (ping response) to the communication device A for communication packet f at time T3.

Each of the above jitters Tx1 to Tx6 is different, so it takes time for communication device B to perform the ping response processing. Therefore, the response time (RTT), which indicates the time between the sending time of the ping and the receiving time of the response ping measured at communication device A, includes the time for response processing at communication device B. The response processing time varies depending on the hardware performance of the communication device 10 and the load at the time.

Moreover, in the communication device A, when sending communication packets, there is a waiting period within the communication device A from the start of the transmission process to actual transmission, which requires an unknown amount of time. The time of the start of the transmission process may be, for example, the time identified by the transmission time as a time stamp. The information processing device 20 of the present example embodiment calculates the time required for transmission processing in one communication device that sent the communication packet and the time required for response processing in the other communication device, in the round trip of the communication packet between these communication devices.

Figure 3:
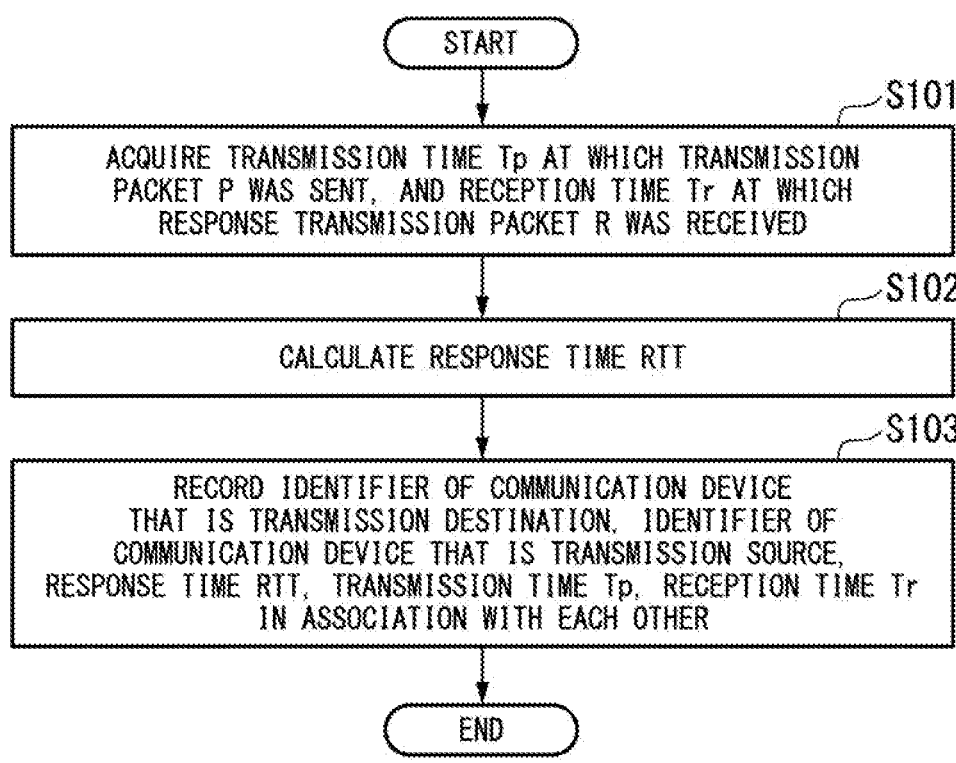
FIG. 3 is a diagram that shows the processing flow of the communication device according to the present example embodiment.

FIG. 3 is a diagram that shows the processing flow of the communication device according to the present example embodiment.

Next, the process of the communication device 10 will be described.

The following describes the processing flow of communication device A using communication device A and communication device B. The measurement unit 11 of the communication device A sends a ping communication packet P to communication device B and receives a communication packet R in response from the communication device B. The measurement unit 11 acquires the transmission time Tp at which the communication packet P was sent and the reception time Tr at which the response communication packet R was received (Step S101). The response time calculation unit 12 calculates the response time RTT using the transmission time Tp, the reception time Tr, and Equation (1) (Step S102). The response time calculation unit 12 associates the identifier of the communication device B, which is the transmission destination of the communication path for which the response time RTT is calculated, the identifier of the own device as the transmission source, the response time RTT, the transmission time Tp, and the reception time Tr and records them in the measurement result DB 13 (Step S103). The measurement unit 11 and response time calculation unit 12 repeat the same process. As a result, the measurement result DB 13 records multiple sets of the identifier of the communication device A as the transmission source, the identifier of the communication device B as the transmission destination, the response time RTT, the transmission time Tp, and the reception time Tr. The communication device A performs the same process with the communication device C as the transmission destination, and records multiple sets of the identifier of the communication device A as the transmission source, the identifier of the communication device B as the transmission destination, the response time RTT as the measurement result, the transmission time Tp, and the reception time Tr in the measurement result DB 13.

The communication device B performs the same process with the communication device A as the transmission destination, and records multiple sets of the identifier of the communication device B as the transmission source, the identifier of the communication device A as the transmission destination, the response time RTT as the measurement result, the transmission time Tp, and the reception time Tr in the measurement result DB 13.

The communication device B performs the same process with the communication device C as the transmission destination, and records multiple sets of the identifier of the communication device B as the transmission source, the identifier of the communication device C as the transmission destination, the response time RTT as the measurement result, the transmission time Tp, and the reception time Tr in the measurement result DB 13.

The communication device C performs the same process with the communication device A as the transmission destination, and records multiple sets of the identifier of the communication device C as the transmission source, the identifier of the communication device A as the transmission destination, the response time RTT as the measurement result, the transmission time Tp, and the reception time Tr in the measurement result DB 13.

The communication device C performs the same process with the communication device B as the transmission destination, and records multiple sets of the identifier of the communication device C as the transmission source, the identifier of the communication device B as the transmission destination, the response time RTT as the measurement result, the transmission time Tp, and the reception time Tr in the measurement result DB 13.

Figure 4:
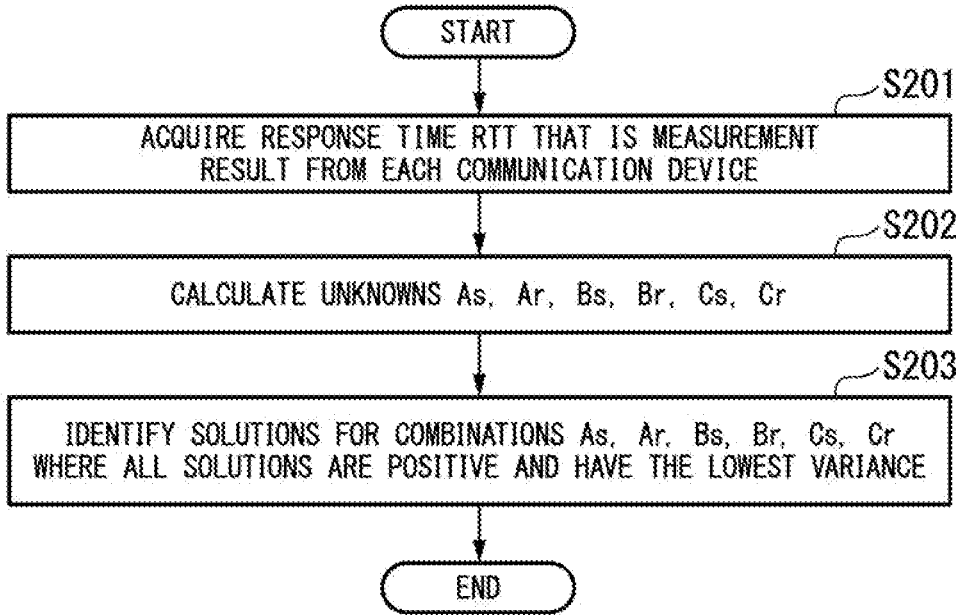
FIG. 4 is a diagram that shows the processing flow of the information processing device according to the present example embodiment.

FIG. 4 is a diagram that shows the processing flow of the information processing device according to the present example embodiment.

Figure 5:
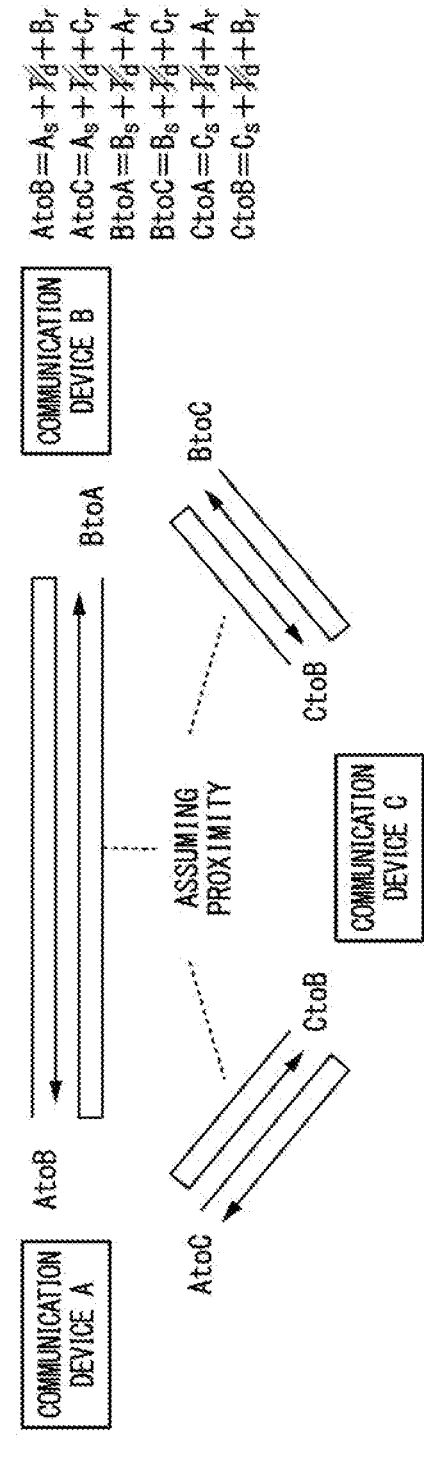
FIG. 5 is a diagram that shows an overview of the process of the information processing device according to the present example embodiment.

FIG. 5 is a diagram that shows an overview of the process of the information processing device according to the present example embodiment.

Next, the process of the information processing device 20 is described. The acquisition unit 21 of the information processing device 20 acquires the identifier of the communication device A as the transmission source, the identifier of the communication device B as the transmission destination, and the response time RTT as the measurement result from the measurement result DB 13 of the communication device A. This response time RTT may be the average value of the response time RTTs associated with the identifier of communication device A as the transmission source and the identifier of communication device B as the transmission destination, which are stored in the measurement result DB 13 of communication device A. This average value may be calculated by the information processing device 20 or by the communication device A and stored in the measurement result DB 13.

The acquisition unit 21 of the information processing device 20 acquires the identifier of the communication device A as the transmission source, the identifier of the communication device B as the transmission destination, and the response time RTT (AtoB) as the measurement result from the measurement result DB 13 of the communication device A.

The acquisition unit 21 of the information processing device 20 acquires the identifier of the communication device A as the transmission source, the identifier of the communication device C as the transmission destination, and the response time RTT (AtoC) as the measurement result from the measurement result DB 13 of the communication device A.

The acquisition unit 21 of the information processing device 20 acquires the identifier of the communication device B as the transmission source, the identifier of the communication device A as the transmission destination, and the response time RTT (BtoA) as the measurement result from the measurement result DB 13 of the communication device B.

The acquisition unit 21 of the information processing device 20 acquires the identifier of the communication device B as the transmission source, the identifier of the communication device C as the transmission destination, and the response time RTT (BtoC) as the measurement result from the measurement result DB 13 of the communication device B.

The acquisition unit 21 of the information processing device 20 acquires the identifier of the communication device C as the transmission source, the identifier of the communication device A as the transmission destination, and the response time RTT (CtoA) as the measurement result from the measurement result DB 13 of the communication device C.

The acquisition unit 21 of the information processing device 20 acquires the identifier of the communication device C as the transmission source, the identifier of the communication device B as the transmission destination, and the response time RTT (CtoB) as the measurement result from the measurement result DB 13 of the communication device C.

These response time RTTs may be the average value of the response time RTTs stored in the measurement result DB 13 of each communication device 10. This average value may be calculated by the information processing device 20 or by each communication device 10 and stored in the measurement result DB 13. These response times RTT may be calculated and updated at predetermined time intervals. With the above process, the acquisition unit 21 acquires the response time RTT, which is the measurement result, from each communication device that constitutes the communication network (Step S201).

When the acquisition unit 21 obtains the calculated response time RTT of each communication device 10 from each communication device 10, the calculation unit 22 calculates the time required for the transmission process in the one communication device 10 that sent the communication packet and the time required for the response process in the other communication device 10, in the round trip of the communication packet between the communication devices 10.

In other words, the calculation unit 22 of the information processing device 20 calculates each estimate value of:

the time As required for transmission processing in the communication device A and the time Br required for response processing in the other communication device B in the communication between the communication devices A and B;

the time As required for transmission processing in the communication device A and the time Cr required for response processing in the other communication device B in the communication between the communication devices A and C;

the time Bs required for transmission processing in the communication device B and the time Ar required for response processing in the other communication device A in the communication between the communication devices B and A;

the time Bs required for transmission processing in the communication device B and the time Cr required for response processing in the other communication device C in the communication between the communication devices B and C;

the time Cs required for transmission processing in the communication device C and the time Ar required for response processing in the other communication device A in the communication between the communication devices C and A; and the time Cs required for transmission processing in the communication device C and the time Br required for response processing in the other communication device B in the communication between the communication devices C and B, using the following system of simultaneous linear equations with six variables of equations (1) through (6) (Step S202).

$$RTT(AtoB)=As+Td+Br \qquad (1)$$

$$RTT(AtoC)=As+Td+Cr \qquad (2)$$

$$RTT(BtoA)=Bs+Td+Ar \qquad (3)$$

$$RTT(BtoC)=Bs+Td+Cr \qquad (4)$$

$$RTT(CtoA)=Cs+Td+Ar \qquad (5)$$

$$RTT(CtoB)=Cs+Td+Br \qquad (6)$$

Td in equations (1) through (6) above indicates the time that communication packets are transmitted over the communication path. As described above, the distance of each communication path is assumed to be such a short distance that the transmission time of communication packets on that communication path is negligible. Accordingly, it can be ignored as Td=0 in each equation. In other words, Td is unknown, but this value can be removed from the equation. Therefore, the system of simultaneous linear equations with six variables of equations (1) through (6) is calculated with Td set to 0. Here, the above system of simultaneous linear equations with six variables is not independent and the solution is undefined. Accordingly, the calculation unit 22 calculates multiple sets of solutions for the unknowns As, Ar, Bs, Br, Cs, and Cr in the aforementioned simultaneous linear equations with six variables and, among the combinations of these solutions, identifies the solutions of As, Ar, Bs, Br, Cs, and Cr of the combination having all positive values and the smallest variance (Step S203).

Figures 6, 7:
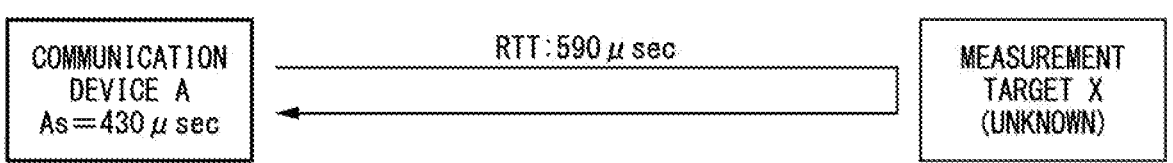
FIG. 6 is a diagram that shows an overview of the process of the calculation unit according to the present example embodiment.
FIG. 7 is a first diagram showing a utilization example according to the present example embodiment.

FIG. 6 shows an overview of the process of the calculation unit 22.

The respective values for each set of unknowns when the calculation unit 22 calculates the unknowns As, Ar, Bs, Br, Cs, and Cr in the above-mentioned system of simultaneous linear equations with six variables are shown in FIG. 6. When calculating multiple sets of values for the unknowns As, Ar, Bs, Br, Cs, and Cr as shown in FIG. 6, the calculation unit 22 identifies the values of the set with the smallest variance among those sets as the estimated values of the unknowns As, Ar, Bs, Br, Cs, and Cr. The example in FIG. 5 shows the case where the calculation unit 22 identifies As=560 (μsec), Ar=700 (μsec), Bs=180 (μsec), Br=130 (μsec), Cs=220 (μsec), and Cr=130 (μsec) for the case where the variance value is the smallest at 5633.33.

According to the above processing, the calculation unit 22 of the information processing device identifies the plurality of relationships between an unknown first required time from the start of the transmission processing to transmission of the first communication packet sent by the first communication device to the second communication device when the response time is obtained, and an unknown second required time from the reception of the first communication packet by the second communication device to the transmission of the second communication packet in response to the first communication device when the response time is obtained, for each of the cases where at least three or more target devices (communication devices 10) are connected for communication and each device of the target device operates as a first communication device and a second communication device.

The calculation unit 22 then calculates the estimated values of the first required time in the first communication device and the second required time in the second communication device by solving the simultaneous linear equations of those relationships.

In this case, if the first communication device is communication device A and the second communication device is communication device B, the first required time indicates As and the second required time indicates Br. If the first communication device is communication device A and the second communication device is communication device C, the first required time indicates As and the second required time indicates Cr.

If the first communication device is communication device B and the second communication device is communication device A, the first required time indicates Bs and the second required time indicates Ar. If the first communication device is communication device B and the second communication device is communication device C, the first required time indicates Bs and the second required time indicates Cr.

If the first communication device is communication device C and the second communication device is communication device A, the first required time indicates Cs and the second required time indicates Ar. If the first communication device is communication device C and the second communication device is communication device B, the first required time indicates Cs and the second required time indicates Br.

The process of the calculation unit 22 described above is a form of the process of identifying, as the estimated value of the first required time and the estimated value of the second required time, the solution of the simultaneous linear equations for the case where the variance of the first required time and the second required time identified for each of at least three target devices (communication devices 10) communicatively connected to each other and operating as the first communication device and the second communication device, respectively, is the smallest and the value is positive.

The above example describes a case where the distance Td of the communication path between each of the 10 communication devices is negligibly short (about 300 m or less). However, even if each communication distance Td is identical, or if the ratio of each communication distance Td is known, the calculation unit 22 may input those values as unknowns in a system of simultaneous linear equations with six variables and calculate the known numbers As, Ar, Bs, Br, Cs, and Cr in the same way. This is a form of the process in which the calculation unit 22 further uses the ratio (of the length) of each communication path when three or more target devices (communication devices 10) are communicatively connected to each other to calculate the estimated value of the first required time in the first communication device and the estimated value of the second required time in the second communication device.

Utilization Example 1

FIG. 7 is a first diagram illustrating an example of utilization according to the present example embodiment.

If, as a result of the above processing, the information processing device 1 has calculated the required time As from the start of transmission processing to the transmission of a communication packet in the communication device A that is the object of observation, the value of RTT used to calculate the required time As can be used to calculate the total time of the response time Xr of the measurement target X, which is an unknown communication device that the communication device A is communicatively connected to, and the transmission time Td of the communication packet between communication device A and the measurement target X. In other words, if As=430 μsec and RTT=590 μsec, the calculation unit 22 can calculate that the total time of the response time Xr of the measurement target X, which is the unknown communication device which the communication device A is communicatively connected to, and Td, which is the transmission time of communication packets between communication device A and measurement target X, is Xr+Td=590−430=160. This total time indicates the time that elapsed from the transmission time of a communication packet at communication device A to the reception time of a response communication packet at the communication device A, when communication device A sends a communication packet to measurement target X connected via a communication network and measurement target X sends a response communication packet to communication device A based on the reception of the communication packet at measurement target X.

Utilization Example 2

FIG. 8 is a second diagram illustrating an example of utilization according to the present example embodiment.

If, as a result of the above processing, the information processing device 1 has calculated the required time As from the start of the transmission processing to the transmission of a communication packet in the communication device A that is the object of observation, and the required time Br that is the time required for communication device B to transmit a communication packet in response to the communication device A after receiving the communication packet from communication device A, it is possible to calculate the medium speed at which the communication packets are transmitted over the communication path using the value of RTT, which was used to calculate the required times As and Br, and the distance of the communication path. In other words, the calculation unit 22 can calculate the medium speed at which communication packets are transmitted on the communication path as $(25 \text{ km}\times2)\div\{RTT-(As+Br)\}=172.412$ km/s, when As=430 μsec, Br=260 μsec, RTT=980 μsec and the transmission distance is 25 km. If the medium speed is calculated using only the RTT and transmission distance without considering the required times As and Br, it is 72.463 km/s. Therefore, more accurate medium speed can be calculated by taking into account the required times As and Br. This process is one form of the process in which the calculation unit 22 calculates the medium speed of a communication packet in the transmission medium that constitutes the communication path between a set of two target devices among the plurality of target devices on the basis of the transmission time of communication packets calculated by subtracting the required time addition value, which is the sum of the estimated value of the first required time of one target device that was identified for the two target devices and the estimated value of the second required time of the other target device, from the response time actually measured for the set of two target devices, and the distance of the communication path between the two target devices.

Utilization Example 3

FIG. 9 is a third diagram illustrating an example of utilization according to the present example embodiment.

If, as a result of the above processing, the information processing device 1 has calculated the required time As from the start of the transmission processing to the transmission of a communication packet in the communication device A that is the object of observation, and the required time Br that is the time required for communication device B to transmit a communication packet in response to the communication device A after receiving the communication packet from communication device A, it is possible to calculate the distance of the communication path using the value of RTT, which was used to calculate the required times As and Br, and the medium speed, which is the speed at which communication packets are transmitted over the communication path. In other words, the calculation unit 22 can calculate the medium speed at which communication packets are transmitted on the communication path as $\{RTT-(As+Br)\}\times172.412$ km/s=12.069 km when As=430 μsec, Br=260 μsec, RTT=830 μsec and the medium speed is 172.412 km/s. If the distance of the communication path is calculated using only RTT and medium speed without considering the time required As and Br, the distance is 71.551 km. Therefore, the distance of the communication path between communication devices can be calculated more accurately by calculating the medium speed considering the required times As and Br. This process is a form of the process in which the calculation unit 22 calculates the distance of the communication path between the two communication devices on the basis of the transmission time of communication packets calculated by subtracting a required time addition value, which is the sum of the estimated value of the first required time of one communication device that was identified of a set of two communication devices among multiple communication devices and the estimated value of the second required time of the other communication device, from the response time actually measured for the set of two communication devices, and the medium speed of communication packets in the transmission medium that constitutes the communication path between the two communication devices.

Utilization Example 4

FIG. 10 is a fourth diagram illustrating an example of utilization according to the present example embodiment.

If, as a result of the above processing, the information processing device 1 has calculated the required time As from the start of the transmission processing to the transmission of a communication packet in the communication device A that is the object of observation, the value of RTT used to calculate the values of the required time As, the medium speed of the communication path, and the distance can be used to calculate the response time Xr of the measurement target X, which is an unknown communication device that the communication device A is communicatively connected to. In other words, calculation unit 22 can calculate the time Xr for the response of the measurement target X as $\{RTT-(As-(25\div172.412))\}=205$ μsec when As=430 μsec, RTT=780 μsec, the medium speed is 172.412 km/s, and the distance of the communication path is 25 km. This process is a form of the process in which the calculation unit 22 calculates the second required time in the measurement target X by subtracting a value obtained by adding, to an estimated value of the first required time identified for one communication device among a plurality of communication devices, the round-trip transmission time between communication devices of a communication packet calculated on the basis of the medium speed of communication packets in the transmission medium comprising the communication path between that communication device and the newly identified unknown communication device and the distance of that communication path from the response time measured between the communication devices.

Utilization Example 5

FIG. 11 is a fifth diagram illustrating an example of utilization according to the present example embodiment.

If, as a result of the above processing, the information processing device 1 has calculated the required time Ar that the communication device A takes from receiving a communication packet from the measurement target X, which is an unknown communication device, to sending a communication packet in response to the measurement target X, the required time Ar and the value of RTT used to calculate the required time Ar can be used to calculate the required time Xs from the start of the transmission process of the communication packet in the observation target X to the time of transmission. In other words, when Ar=830 μsec and RTT=980 μsec, the calculation unit 22 can calculate the total time, which is the sum of time Xs, which is the time taken from the start of the transmission processing to the transmission by the measurement target X, which is an unknown communication device communicatively connected to the communication device A, and the transmission time Td of communication packets between the measurement target X and the communication device A as RTT−Ar=980−830=150 μsec (=Xs+Td). This process corresponds to the process in which the calculation unit 22 calculates the sum of the estimated value of the first required time at the measurement target X, which is an unknown communication device, and the transmission time of communication packets on the communication path between the measurement target X and the communication device A.

Utilization Example 6

FIG. 12 is a sixth diagram illustrating an example of utilization according to the present example embodiment.

If, as a result of the above processing, the information processing device 1 has calculated the required time Ar that the communication device A takes from receiving a communication packet from the measurement target X, which is an unknown communication device, to sending a communication packet in response to the measurement target X, each value of the RTT used to calculate the required time Ar, the medium speed of the communication path, and the distance can be used to calculate the time Xs taken from the start of the transmission processing of the measurement target X, which is an unknown communication device, to the transmission. In other words, when Ar=830 μsec, RTT=1030 μsec, the medium speed is 172.412 km/s, and the distance of the communication path is 25 km, the calculation unit 22 can calculate the time Xs taken from the start of the transmission processing of the measurement target X to the transmission as $\{RTT-(Ar-(25\div1))\}=55$ μsec. This process is a form of the process in which the calculation unit 22 calculates the first required time in the unknown communication device by subtracting a value obtained by adding, to an estimated value of the second required time identified for one communication device among a plurality of communication devices, the round-trip transmission time between communication devices of a communication packet calculated on the basis of the medium speed of communication packets in the transmission medium comprising the communication path between that communication device and the newly identified unknown communication device and the distance of that communication path from the response time measured between the communication devices.

Figure 13:
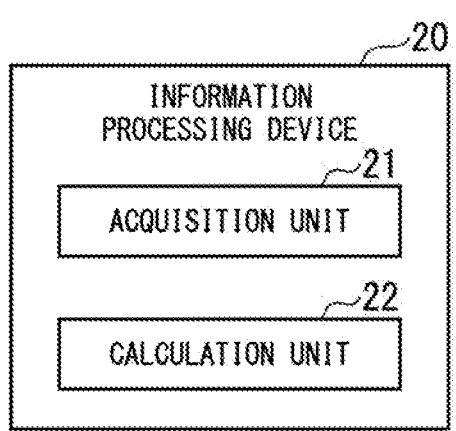
FIG. 13 is a diagram showing another configuration of the information processing device.

FIG. 13 shows another configuration of the information processing device.

Figure 14:
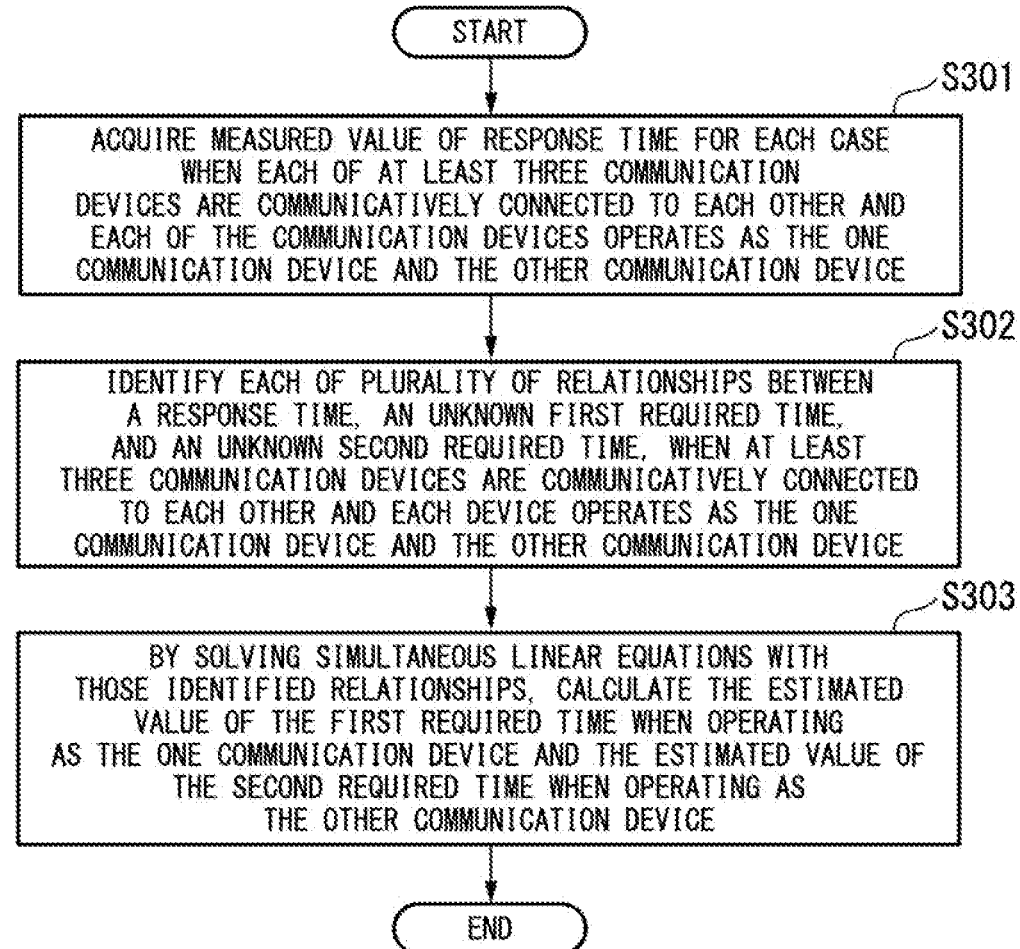
FIG. 14 is a diagram showing the processing flow of the information processing device shown in FIG. 15.

FIG. 14 shows the processing flow of the information processing device shown in FIG. 14.

The information processing device 20 has at least the acquisition unit 21 and the calculation unit 22.

When one communication device sends a communication packet to another communication device connected via a communication network, and the other communication device sends a response communication packet to the one communication device based on the reception of the communication packet at the other communication device, the acquisition unit 21 of the information processing device 20 acquires the measured value of the response time from the start of the transmission processing of the communication packet in the one communication device to the reception time of the response communication packet when each of at least three communication devices are communicatively connected to each other and each of the communication devices operates as the one communication device and the other communication device (Step S301).

The calculation unit 22 of the information processing device 20 identifies a plurality of relationships between the response time, an unknown first required time from the start of the transmission processing of a communication packet in one communication device to transmission when the response time is obtained, and an unknown second required time from receiving the communication packet in the other communication device to transmission of a response communication packet when the response time is obtained, when at least three communication devices are communicatively connected to each other and each device operates as the one communication device and the other communication device (Step S302).

By solving simultaneous linear equations with those identified relationships, the calculation unit 22 calculates each of the estimated value of the first required time when operating as the one communication device and the estimated value of the second required time when operating as the other communication device (Step S303).

(Hardware Configuration)

Figure 15:
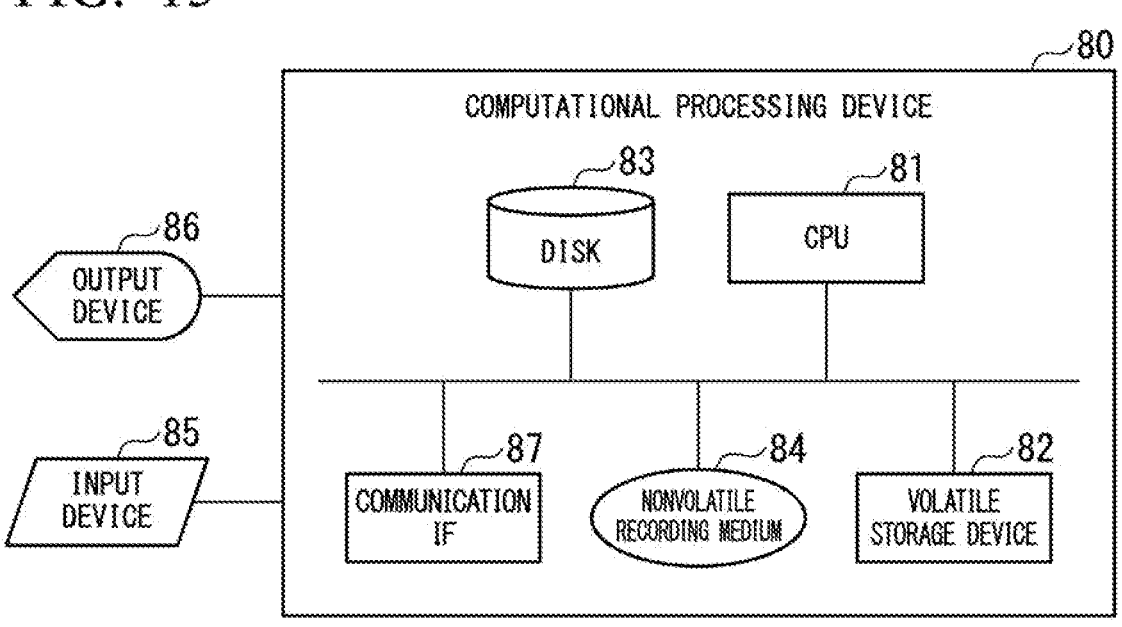
FIG. 15 is a block diagram that schematically illustrates a hardware configuration example of a computational processing device capable of realizing the communication device and information processing device for each example embodiment.

FIG. 15 is a block diagram that schematically illustrates a hardware configuration example of a computational processing device capable of realizing the communication device 10 and information processing device 20 according to each example embodiment of the present disclosure.

An example of a hardware resource configuration for realizing the communication device 10 or information processing device 20 using a single computational processing device (information processing device, computer) will be described. However, the communication device 10 and the information processing device 20 may be physically or functionally realized using at least two computing and processing devices. Additionally, the communication device 10 or information processing device 20 in question may be implemented as a dedicated device.

The computational processing device 80 has a central processing unit (hereinbelow referred to as "CPU") 81, a volatile storage device 82, a disk 83, a nonvolatile recording medium 84, and a communication interface (hereinafter referred to as "communication IF") 87. The computational processing device 80 may be connectable to the input device 85 and the output device 86. The computational processing device 80 can send and receive information to and from other computational processing devices and other communication devices via the communication IF 87.

The nonvolatile recording medium 84 is a computer-readable medium, such as a compact disc (CD) or digital versatile disc (DVD). The nonvolatile storage medium 84 may be a universal serial bus memory (USB memory), a solid-state drive (SSD), or the like. The nonvolatile recording medium 84 allows for programs to be stored and carried even without a power supply. The nonvolatile recording medium 84 is not limited to the media described above. Instead of the nonvolatile recording medium 84, the relevant program may be carried via the communication IF 87 and the communication network.

The volatile storage device 82 is readable by a computer and can temporarily store data. Examples of the volatile storage device 82 include dynamic random-access memory (DRAM), static random-access memory (SRAM), and other types of memory.

In other words, when executing software programs (hereinafter referred to simply as "programs") stored on the disk 83, the CPU 81 copies the programs into the volatile storage device 82 and performs arithmetic processing. The CPU 81 reads the data necessary for program execution from the volatile storage device 82. When display is required, the CPU 81 displays the output results on the output device 86. When a program is input from outside, the CPU 81 reads the program from the input device 85. The CPU 81 interprets and executes the program in the volatile memory device 82 corresponding to the functions (processing) represented by the parts shown in FIG. 1. The CPU 81 executes the processes described in each of the above-mentioned example embodiments of the disclosure. In other words, in such cases, each example embodiment of the present disclosure can be viewed as being made possible by the relevant program. Furthermore, each example embodiment of the present disclosure can also be realized by a computer-readable, nonvolatile recording medium on which the relevant program is recorded.

While preferred example embodiments of the disclosure have been described and illustrated above, it should be understood that these are exemplary of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims.

Some or all of the above example embodiments may also be described as, but not limited to, the following supplementary notes.

(Supplementary Note 1)

An information processing device including:

a memory configured to store instructions;

a processor configured to execute the instructions to:

acquire a measured value of a response time for each of combinations of two target devices of at least three target devices that are communicatively connected to each other, with one of the two devices operating as a first communication device and the other one of the two devices operating as a second communication device that is connected to the first communication device via a communication network, the measured value of the response time being a measured value of a time from start of transmission process of a first communication packet to reception of a second communication packet, the first communication packet being a packet sent from the first communication device to the second communication device, the second communication packet being a packet sent from the second communication device to the first communication device in response to reception of the first communication packet by the second communication device;

identify, for each of the combinations, a relationship of the response time, an unknown first required time, and the unknown second required time, the first required time being a time from the start of the transmission processing to transmission of the first communication packet, the second required time being a time from the reception of the first communication packet by the second communication device to the transmission of the second communication packet; and calculate an estimated value of the first required time and an estimated value of the second required time by solving simultaneous linear equations of the identified relationship for each of the combinations.

(Supplementary Note 2)

The information processing device according to Supplementary Note 1, wherein the processor is configured to execute the instructions to identify, as the estimated value of the first required time and the estimated value of the second required time, a solution of the simultaneous linear equations in which a variance of the first required time and the second required time is minimized and values of the first required time and the second required time are positive, among solutions of the simultaneous linear equations.

(Supplementary Note 3)

The information processing device according to Supplementary Note 1 or Supplementary Note 2, wherein the processor is configured to execute the instructions to further use a ratio of each length of a communication path between two of the at least three target devices to calculate the estimated value of the first required time and the estimated value of the second required time.

(Supplementary Note 4)

The information processing device according to any one of Supplementary Note 1 to Supplementary Note 3, wherein the processor is configured to execute the instructions to calculate a required time from a transmission time of a third communication packet by one target device of the at least three target devices to a reception time of a fourth communication packet by the one target device, based on the estimated value of the first required time of the one target device and a measured response time between the one target device and a newly identified unknown communication device, the third communication packet being a packet sent from the one target device to the unknown communication device, the fourth communication packet being a packet sent from the unknown communication device to the one target device in response to reception of the third communication packet by the unknown communication device.

(Supplementary Note 5)

The information processing device according to any one of Supplementary Note 1 to Supplementary Note 4, wherein the processor is configured to execute the instructions to calculate a medium speed of a communication packet in a transmission medium that constitutes a communication path between two target devices that constitute one of the combinations, based on a transmission time of the communication packet and a distance of the communication path between the two target devices, the transmission time of the communication packet being calculated by subtracting a required time addition value from the response time actually measured for the combination of two target devices, the required time addition value being a sum of the estimated value of the first required time of one of the two target devices and the estimated value of the second required time of the other one of two target devices.

(Supplementary Note 6)

The information processing device according to any one of Supplementary Note 1 to Supplementary Note 5, wherein the processor is configured to execute the instructions to calculate a distance of a communication path between two target devices that constitute one of the combinations, based on a transmission time of a communication packet and a medium speed of the communication packet in a transmission medium constituting a communication path between the two target devices, the transmission time of the communication packet being calculated by subtracting a required time addition value from the response time actually measured for the combination of two target devices, the required time addition value being a sum of the estimated value of the first required time of one of the two target devices and the estimated value of the second required time of the other one of two target devices.

(Supplementary Note 7)

The information processing device according to any one of Supplementary Note 1 to Supplementary Note 6, the processor is configured to execute the instructions to calculate a third required time in a newly identified unknown communication device by subtracting a total value from a response time actually measured between one target device of the at least three target device and the unknown communication device, the total value being obtained by adding, to the estimated value of the first required time of the one target device, a round-trip transmission time between the one target device and the unknown communication device of a communication packet in a transmission medium constituting a communication path between the one target device and the newly identified unknown communication device, the round-trip transmission time being calculated based on a medium speed of the communication packet and a distance of the communication path, the third required time being a time from reception of the communication packet by the unknown communication device to transmission of the communication packet.

(Supplementary Note 8)

The information processing device according to any one of Supplementary Note 1 to Supplementary Note 7, wherein the processor is configured to execute the instructions to calculate a sum of an estimated value of a third required time in a newly identified unknown communication device and a transmission time of a communication packet on a communication path between the unknown communication device and one target device of the at least three target device, based on the estimated value of the second required time of the one target device and the response time actually measured between the one target device and the unknown communication device, the third required time being a time from start of transmission processing of the third communication packet to transmission of the third communication packet by the unknown communication device, the fourth required time being a time from reception of the third communication packet by the one communication device to transmission of the fourth communication packet.

(Supplementary Note 9)

The information processing device according to any one of Supplementary Note 1 to Supplementary Note 8, wherein the processor is configured to execute the instructions to calculate a third required time value in a newly identified unknown communication device by subtracting a total value from a response time actually measured between one target device of the at least three target device and the unknown communication device, the total value being obtained by adding, to the estimated value of the second required time of the one target device, a round-trip transmission time between the one target device and the unknown communication device of a communication packet in a transmission medium constituting a communication path between the one target device and the unknown communication device, the round-trip transmission time being calculated based on a medium speed of the communication packet and a distance of the communication path, the third required time being a time from start of transmission processing to transmission of the third communication packet by the unknown communication device.

(Supplementary Note 10)

An information processing method including:

acquiring a measured value of a response time for each of combinations of two target devices of at least three target devices that are communicatively connected to each other, with one of the two devices operating as a first communication device and the other one of the two devices operating as a second communication device that is connected to the first communication device via a communication network, the measured value of the response time being a measured value of a time from start of transmission process of a first communication packet to reception of a second communication packet, the first communication packet being a packet sent from the first communication device to the second communication device, the second communication packet being a packet sent from the second communication device to the first communication device in response to reception of the first communication packet by the second communication device;

identifying, for each of the combinations, a relationship of the response time, an unknown first required time, and the unknown second required time, the first required time being a time from the start of the transmission processing to transmission of the first communication packet, the second required time being a time from the reception of the first communication packet by the second communication device to the transmission of the second communication packet; and calculating an estimated value of the first required time and an estimated value of the second required time by solving simultaneous linear equations of the identified relationship for each of the combinations.

(Supplementary Note 11)

A non-transitory computer-readable recording mediums that stores program for causes a computer to execute:

acquiring a measured value of a response time for each of combinations of two target devices of at least three target devices that are communicatively connected to each other, with one of the two devices operating as a first communication device and the other one of the two devices operating as a second communication device that is connected to the first communication device via a communication network, the measured value of the response time being a measured value of a time from start of transmission process of a first communication packet to reception of a second communication packet, the first communication packet being a packet sent from the first communication device to the second communication device, the second communication packet being a packet sent from the second communication device to the first communication device in response to reception of the first communication packet by the second communication device;

identifying, for each of the combinations, a relationship of the response time, an unknown first required time, and the unknown second required time, the first required time being a time from the start of the transmission processing to transmission of the first communication packet, the second required time being a time from the reception of the first communication packet by the second communication device to the transmission of the second communication packet; and calculating an estimated value of the first required time and an estimated value of the second required time by solving simultaneous linear equations of the identified relationship for each of the combinations.

What is claimed is:

1. An information processing device comprising:

a memory configured to store instructions;

a processor configured to execute the instructions to:

acquire a measured value of a response time for each of combinations of two target devices of at least three target devices that are communicatively connected to each other, with one of the two devices operating as a first communication device and the other one of the two devices operating as a second communication device that is connected to the first communication device via a communication network, the measured value of the response time being a measured value of a time from start of transmission process of a first communication packet to reception of a second communication packet, the first communication packet being a packet sent from the first communication device to the second communication device, the second communication packet being a packet sent from the second communication device to the first communication device in response to reception of the first communication packet by the second communication device;

identify, for each of the combinations, a relationship of the response time, a first required time that is unknown, and a second required time that is unknown, the first required time being a time from the start of the transmission processing to transmission of the first communication packet, the second required time being a time from the reception of the first communication packet by the second communication device to the transmission of the second communication packet; and calculate an estimated value of the first required time and an estimated value of the second required time by solving simultaneous linear equations of the identified relationship for each of the combinations.

2. The information processing device according to claim 1, wherein the processor is configured to execute the instructions to identify, as the estimated value of the first required time and the estimated value of the second required time, a solution of the simultaneous linear equations in which a variance of the first required time and the second required time is minimized and values of the first required time and the second required time are positive, among solutions of the simultaneous linear equations.

3. The information processing device according to claim 1, wherein the processor is configured to execute the instructions to further use a ratio of each length of a communication path between two of the at least three target devices to calculate the estimated value of the first required time and the estimated value of the second required time.

4. The information processing device according to claim 1, wherein the processor is configured to execute the instructions to calculate a required time from a transmission time of a third communication packet by one target device of the at least three target devices to a reception time of a fourth communication packet by the one target device, based on the estimated value of the first required time of the one target device and a measured response time between the one target device and a newly identified unknown communication device, the third communication packet being a packet sent from the one target device to the unknown communication device, the fourth communication packet being a packet sent from the unknown communication device to the one target device in response to reception of the third communication packet by the unknown communication device.

5. The information processing device according to claim 1, wherein the processor is configured to execute the instructions to calculate a medium speed of a communication packet in a transmission medium that constitutes a communication path between two target devices that constitute one of the combinations, based on a transmission time of the communication packet and a distance of the communication path between the two target devices, the transmission time of the communication packet being calculated by subtracting a required time addition value from the response time actually measured for the combination of two target devices, the required time addition value being a sum of the estimated value of the first required time of one of the two target devices and the estimated value of the second required time of the other one of two target devices.

6. The information processing device according to claim 1, wherein the processor is configured to execute the instructions to calculate a distance of a communication path between two target devices that constitute one of the combinations, based on a transmission time of a communication packet and a medium speed of the communication packet in a transmission medium constituting a communication path between the two target devices, the transmission time of the communication packet being calculated by subtracting a required time addition value from the response time actually measured for the combination of two target devices, the required time addition value being a sum of the estimated value of the first required time of one of the two target devices and the estimated value of the second required time of the other one of two target devices.

7. The information processing device according to claim 1, the processor is configured to execute the instructions to calculate a third required time in a newly identified unknown communication device by subtracting a total value from a response time actually measured between one target device of the at least three target device and the unknown communication device, the total value being obtained by adding, to the estimated value of the first required time of the one target device, a round-trip transmission time between the one target device and the unknown communication device of a communication packet in a transmission medium constituting a communication path between the one target device and the newly identified unknown communication device, the round-trip transmission time being calculated based on a medium speed of the communication packet and a distance of the communication path, the third required time being a time from reception of the communication packet by the unknown communication device to transmission of the communication packet.

8. The information processing device according to claim 1, wherein the processor is configured to execute the instructions to calculate a sum of an estimated value of a third required time in a newly identified unknown communication device and a transmission time of a communication packet on a communication path between the unknown communication device and one target device of the at least three target device, based on the estimated value of the second required time of the one target device and the response time actually measured between the one target device and the unknown communication device, the third required time being a time from start of transmission processing of the third communication packet to transmission of the third communication packet by the unknown communication device, the fourth required time being a time from reception of the third communication packet by the one communication device to transmission of the fourth communication packet.

9. The information processing device according to claim 1, wherein the processor is configured to execute the instructions to calculate a third required time value in a newly identified unknown communication device by subtracting a total value from a response time actually measured between one target device of the at least three target device and the unknown communication device, the total value being obtained by adding, to the estimated value of the second required time of the one target device, a round-trip transmission time between the one target device and the unknown communication device of a communication packet in a transmission medium constituting a communication path between the one target device and the unknown communication device, the round-trip transmission time being calculated based on a medium speed of the communication packet and a distance of the communication path, the third required time being a time from start of transmission processing to transmission of the third communication packet by the unknown communication device.

10. An information processing method comprising:
acquiring a measured value of a response time for each of combinations of two target devices of at least three target devices that are communicatively connected to each other, with one of the two devices operating as a first communication device and the other one of the two devices operating as a second communication device that is connected to the first communication device via a communication network, the measured value of the response time being a measured value of a time from start of transmission process of a first communication packet to reception of a second communication packet, the first communication packet being a packet sent from the first communication device to the second communication device, the second communication packet being a packet sent from the second communication device to the first communication device in response to reception of the first communication packet by the second communication device;
identifying, for each of the combinations, a relationship of the response time, a first required time that is unknown, and a second required time that is unknown, the first required time being a time from the start of the transmission processing to transmission of the first communication packet, the second required time being a time from the reception of the first communication packet by the second communication device to the transmission of the second communication packet; and
calculating an estimated value of the first required time and an estimated value of the second required time by solving simultaneous linear equations of the identified relationship for each of the combinations.

11. A non-transitory computer-readable recording mediums that stores program for causes a computer to execute:
acquiring a measured value of a response time for each of combinations of two target devices of at least three target devices that are communicatively connected to each other, with one of the two devices operating as a first communication device and the other one of the two devices operating as a second communication device that is connected to the first communication device via a communication network, the measured value of the response time being a measured value of a time from start of transmission process of a first communication packet to reception of a second communication packet, the first communication packet being a packet sent from the first communication device to the second communication device, the second communication packet being a packet sent from the second communication device to the first communication device in response to reception of the first communication packet by the second communication device;
identifying, for each of the combinations, a relationship of the response time, a first required time that is unknown, and a second required time that is unknown, the first required time being a time from the start of the transmission processing to transmission of the first communication packet, the second required time being a time from the reception of the first communication packet by the second communication device to the transmission of the second communication packet; and
calculating an estimated value of the first required time and an estimated value of the second required time by solving simultaneous linear equations of the identified relationship for each of the combinations.

* * * * *